United States Patent
Brewer et al.

(10) Patent No.: US 11,431,653 B2
(45) Date of Patent: Aug. 30, 2022

(54) PACKET ARBITRATION FOR BUFFERED PACKETS IN A NETWORK DEVICE

(71) Applicant: Micron Technology, Inc., Boise, ID (US)

(72) Inventors: Tony Brewer, Plano, TX (US); Kirk D. Pospesel, Clinton Corners, NY (US); Michael Grassi, Shokan, NY (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/074,988

(22) Filed: Oct. 20, 2020

(65) Prior Publication Data

US 2022/0124051 A1    Apr. 21, 2022

(51) Int. Cl.
| H04L 49/253 | (2022.01) |
| H04L 49/35 | (2022.01) |
| H04L 47/36 | (2022.01) |
| H04L 47/62 | (2022.01) |

(52) U.S. Cl.
CPC ............ H04L 49/254 (2013.01); H04L 47/36 (2013.01); H04L 47/6225 (2013.01); H04L 49/35 (2013.01)

(58) Field of Classification Search
None
See application file for complete search history.

(56) References Cited

U.S. PATENT DOCUMENTS

| 7,319,669 | B1 | 1/2008 | Kunz et al. |
| 8,122,729 | B2 | 2/2012 | Wallach et al. |
| 8,156,307 | B2 | 4/2012 | Wallach et al. |
| 8,205,066 | B2 | 6/2012 | Brewer et al. |
| 8,325,723 | B1 | 12/2012 | Wang et al. |
| 8,423,745 | B1 | 4/2013 | Brewer |
| 8,561,037 | B2 | 10/2013 | Brewer et al. |
| 9,710,384 | B2 | 7/2017 | Wallach et al. |
| 10,990,391 | B2 | 4/2021 | Brewer |
| 10,990,392 | B2 | 4/2021 | Brewer |
| 11,100,028 | B1 * | 8/2021 | Subramaniam ..... G06F 13/4027 |

(Continued)

FOREIGN PATENT DOCUMENTS

| WO | 2010051167 | 5/2010 |
| WO | 2013184380 | 12/2013 |

(Continued)

OTHER PUBLICATIONS

"International Application Serial No. PCT US2021 054249, International Search Report dated Jan. 20, 2022", 4 pgs.

(Continued)

*Primary Examiner* — Alex Skripnikov

(74) *Attorney, Agent, or Firm* — Schwegman Lundberg & Woessner, P.A.

(57) ABSTRACT

Devices and techniques for packet arbitration for buffered packets in a network device are described herein. A packet can be received at an input of the network device. The packet can be placed in a buffer for the input and a characteristic of the packet can be obtained. A record for the packet, that includes the characteristic, is written into a data structure that is independent of the buffer. Arbitration, based on the characteristic of the packet in the record, can then be performed among multiple packets to select a next packet from the buffer for delivery to an output.

27 Claims, 5 Drawing Sheets

(56) References Cited

U.S. PATENT DOCUMENTS

| | | |
|---|---|---|
| 2002/0146023 A1 | 10/2002 | Myers |
| 2007/0153818 A1* | 7/2007 | Lakshmanamurthy ...................... H04L 49/90 370/412 |
| 2008/0123641 A1* | 5/2008 | Park ...................... G06F 3/1209 370/389 |
| 2008/0151909 A1 | 6/2008 | Scott et al. |
| 2008/0212472 A1* | 9/2008 | Musacchio ............. H04Q 3/68 370/232 |
| 2008/0270708 A1 | 10/2008 | Warner et al. |
| 2012/0079177 A1 | 3/2012 | Brewer et al. |
| 2013/0332711 A1 | 12/2013 | Leidel et al. |
| 2015/0143350 A1 | 5/2015 | Brewer |
| 2015/0206561 A1 | 7/2015 | Brewer et al. |
| 2019/0042214 A1 | 2/2019 | Brewer |
| 2019/0171604 A1 | 6/2019 | Brewer |
| 2019/0243700 A1 | 8/2019 | Brewer |
| 2019/0303154 A1 | 10/2019 | Brewer |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2020/0067814 A1 | 2/2020 | Zheng et al. |
| 2021/0055964 A1 | 2/2021 | Brewer |
| 2021/0064374 A1 | 3/2021 | Brewer |
| 2021/0064435 A1 | 3/2021 | Brewer |
| 2021/0149600 A1 | 5/2021 | Brewer |

FOREIGN PATENT DOCUMENTS

| | | |
|---|---|---|
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

OTHER PUBLICATIONS

"International Application Serial No. PCT US2021 054249, Written Opinion dated Jan. 20, 2022", 4 pgs.

* cited by examiner

PACKET ARBITRATION FOR BUFFERED PACKETS IN A NETWORK DEVICE

BACKGROUND

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets can be packaged together to facilitate interconnection with other components of a larger system. Each chiplet can include one or more individual integrated circuits (ICs), or "chips", potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics can be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

FIG. 1, described below, offers an example of a chiplet system and the components operating therein. The chiplet system can use a packet-based network to communicate between chiplets, such as the chiplet protocol interface described below. Such a packet-based approach can enable flexible and efficient tolerance of varying response time latencies between chiplets with different implementations or relative positions between each other within the chiplet system. Generally, such packet-based network interfaces implement a buffer on an input interface to hold received packets prior to servicing by, for example, an output port of the network device. When there are multiple inputs or multiple outputs, the network device can include an arbiter to transfer packets from an input to an output. A straightforward arbiter implementation can service input buffers in a round-robin fashion, sequentially taking the packet (or decoded packet information) from the head of each input buffer in turn and delivering it to the appropriate output.

More sophisticated arbiter implementations can consider packet characteristics, such as size, destination output port, etc. and select among the packets at the head of the input buffers based on these characteristics to prevent, for example, wasted cycles when there is contention on an output port. However, arbiter implementations that store packets in buffers and arbitrate reading those buffers, typically only arbitrate the packets that are visible at the head (e.g., output) of that buffer. Such a strategy can still result in contention at outputs due to a packet deeper in a given input buffer.

To improve arbiter performance, the arbiter can be configured to consider more packets than just the packets visible at the output of an input buffer. This can be accomplished by maintaining a packet characteristic data structure for the packets held within the input buffers. Thus, the arbiter chooses between possible packets to remove form an input buffer and deliver to an output using the packet characteristics. Recording packet information pertinent to read arbitration in a separate structure can allow more packets to be considered by the arbiter. Information like packet size and location in the buffer can be used by the arbiter to qualify a packet and avoid collisions when reading packets in the buffer. An arbiter that is aware of more packets than simply those at the head of an input buffer can increase efficiency and lower latency. Additional details and examples are provided below.

Figure 1A:
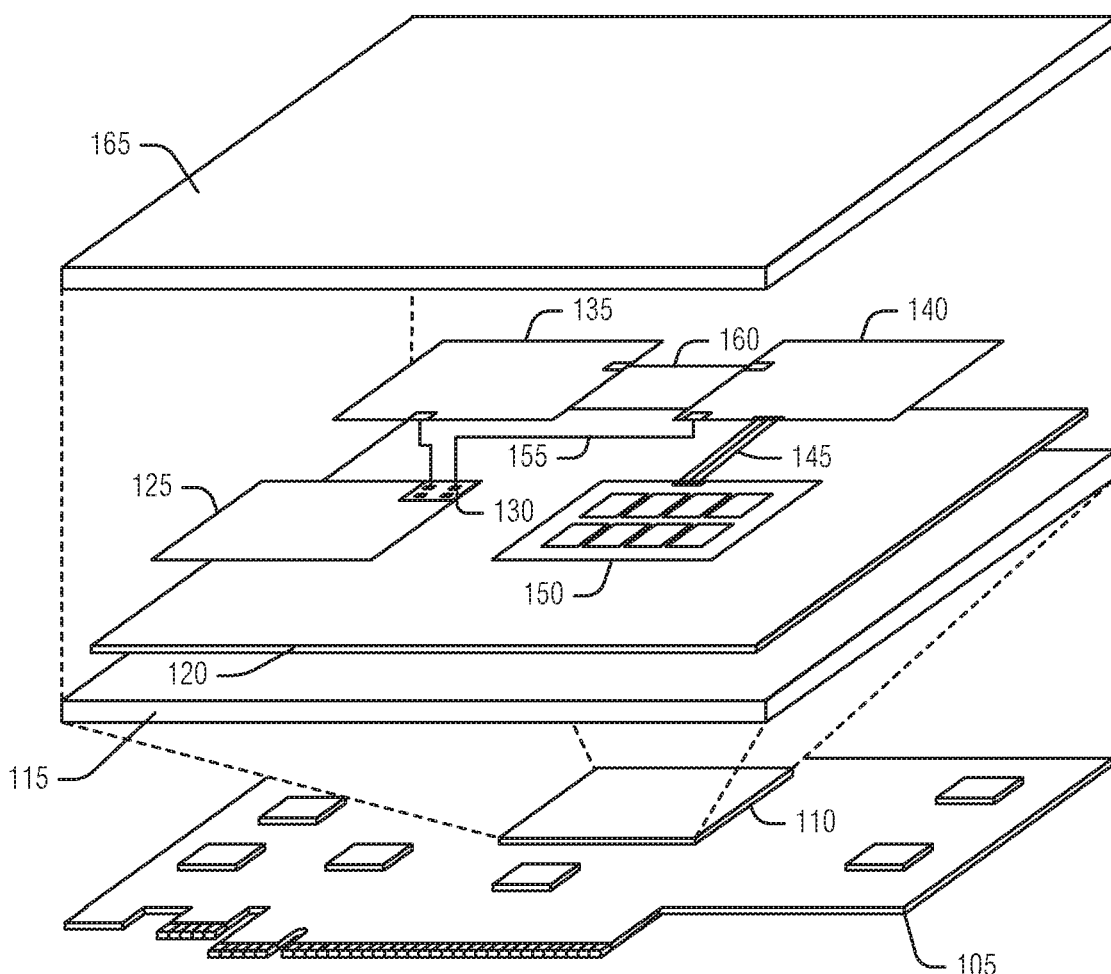
FIGS. 1A and 1B illustrate an example of a chiplet system, according to an embodiment.
Figure 1B:
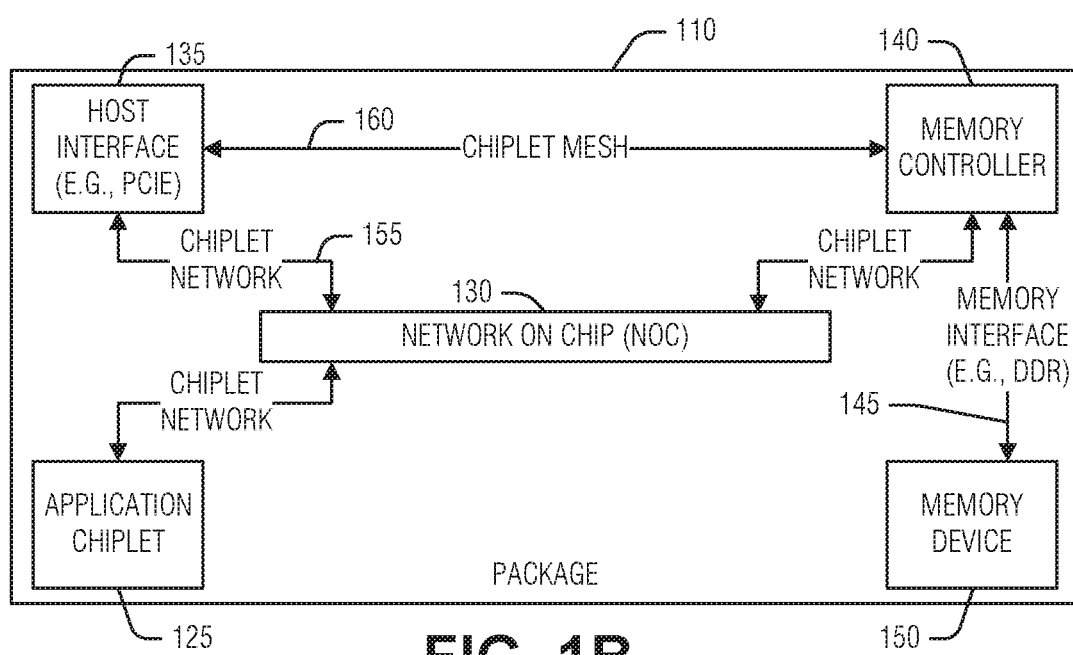

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems can include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 can be included on the application chiplet 125. In an example, NOC 130 can be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface can be implemented, in an example, through a host interface chiplet 135, which in the depicted example, provides a POE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write or erase data. Often, the memory controller chiplet 140 can provide additional features, such as error detection, error correction, maintenance operations, or atomic operator execution. For some types of memory maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 140. In other chiplet systems, the atomic operators can be performed by other chiplets. For example, an atomic operator of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic operators avoid transmitting the data across the chiplet network 160, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets can be provided. In an example, these memory device chiplets can each implement one or multiple storage technologies. In an example, a memory chiplet can include, multiple stacked memory die of different technologies, for example one or more static random access memory (SRAM) devices stacked or otherwise in communication with one or more dynamic random access memory (DRAM) devices. Memory controller 140 can also serve to coordinate operations between multiple memory chiplets in chiplet system 110; for example to utilize one or more memory chiplets in one or more levels of cache storage and to use one or more additional memory chiplets as main memory. Chiplet system 110 can also include multiple memory controllers 140, as can be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
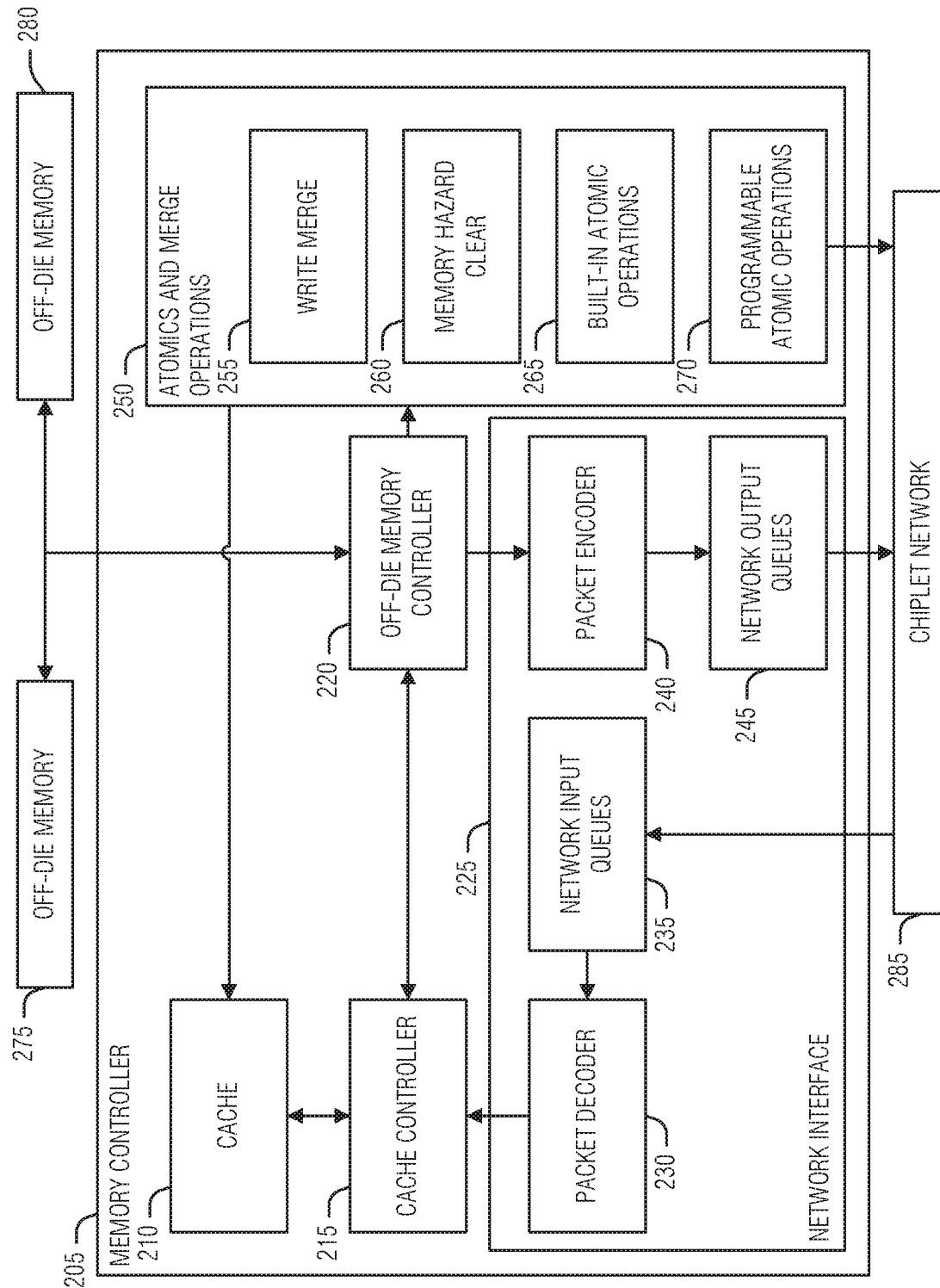
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge units 250. Members of this set can include, for example, a write merge unit 255, a memory hazard unit 260, built-in atomic unit 265, or a PAU 270. The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples can be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and can be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

The network communication interface 225 can be configured to implement packet arbitration for buffered packets. In this context, the memory controller 205 can be considered a network device. The same mechanisms can also be applied to any chiplet in a chiplet system, such as the application chiplet 125 in the chiplet system 110, or to a dedicated network device, such as the NOC 130. In the example of a NOC, the network device can be a switch. However, for simplicity, the network communication interface 225 is used as the example network device for the described packet arbitration techniques.

The network communication interface 225 is configured to receive a packet at an input. As illustrated, the input is connected to the chiplet network 285 and delivers the packet to an input queue 235. As noted above in FIG. 1, a CPI to AXI bridge can include multiple inputs from a single hardware connection through a virtual channel. Thus the packet specifies a virtual channel that is treated like a distinct hardware input once received. In cases that have this type of arrangement, the network input queues 235 can include multiple buffers at least one for each virtual input.

The network communication interface 225 is configured to place the received packet in a buffer for the input. Thus, when a packet is received for input A, buffer A is used to store the packet. In an example, the buffer is implemented as a first-in-first-out (FIFO) queue, the packet being inserted (e.g., pushed) at the tail of the buffer and removed (popped) from the head of the buffer. The actual hardware implementation can vary, with, for example a head pointer and a tail pointer to a contiguous region of random access memory. Here, multiple buffers can be implemented in the memory, the buffers maintaining separation by constraints on addresses being used to access the memory. Such an arrangement can also be efficient as packets need not be moved in the memory to move towards the head of the queue. Rather, when the queue pointers move, the relative position of any given packet moves without copy the packet to a new memory address. However, other buffer implementations can also be used.

The network communication interface 225 is configured to obtain a characteristic of the packet, for example, by packet analyzer circuitry. To obtain the packet characteristic, the network communication interface 225 can read information from the packet (e.g., a destination), take a measurement of the packet (e.g., the size of the packet), or record a context of the packet (e.g., what position the packet occupies in an input buffer or the time the packet has spent in the buffer). The specific packet characteristic obtained by the network communication interface 225 can vary widely, but generally will address information relevant to arbitrating the packet delivery to an output in view of other packets being arbitrated. Thus, the size and position of the packet help to determine how long (e.g., how many clock cycles) a given output will be unavailable while the packet is being delivered to the output. In an example, for varying values such as the packet context (e.g., position in a buffer), the network communication interface 225 is configured to continually monitor (e.g., through polling or in an event driven manner) the context and obtain updated packet characteristics as they become available.

The network communication interface 225 is configured to write a record for the packet into a data structure, for example by the packet analyzer circuitry. The written record includes the packet characteristic obtained by the network communication interface 225. This data structure can be referred to as ArbInfo, as it is information relevant to arbitration. In an example, the data structure is independent of the buffer. Maintaining the data structure separately from the buffer can provide a simpler or more flexible design of the buffer and the data structure. In an example, when packet characteristics are dynamic, such as the packet position in a buffer, the network communication interface 225 is configured to update the packet's record in the data structure as updated information about the packet is obtained. In an example, the record includes multiple characteristics of the packet. Thus, a single record is used to hold multiple packet characteristics for a single packet.

The network communication interface 225 is configured to perform arbitration among multiple packets to select a next packet from the buffer for delivery to an output. The arbitration can be performed by dedicated arbiter circuitry (e.g., arbiter 330 illustrated in FIG. 3). The arbitration is based on (e.g., considers) the characteristic or characteristics, of the packet as written in the record for the packet held in the data structure. In an example, when the record includes multiple packet characteristics, the arbitration among the multiple packets to select the next packet from the buffer is based on the multiple characteristics of the packet held in the record in the data structure. Thus, in this example, more than one characteristic, or all characteristics, are used in the arbitration. Primarily, the arbitration seeks to reduce contention on outputs to prevent stalling reads of an input buffer. An example of the arbitration based on the packet characteristics can include, given three input buffers, a situation where the packet at the head of buffer A is destined for output Z and is large, the head of buffer B is destined for output Y and the second packet in buffer B is destined for output Z, and the head of buffer C is destined for output Y. Here, the arbiter can select the head of buffer A and skip buffer B to select the head of buffer C on the next clock cycle because buffer B will stall on the second packet waiting for the read of buffer A to complete. Alternatively, Buffer B can be selected to deliver to outputs Z and Y for its first two packets if they are small before deliver the larger packets to these outputs from Buffers A and C.

In an example, the data structure is one of a set of data structures corresponding to the buffer and used to hold characteristics for buffered packets considered in the arbitration. In an example, the cardinality (e.g., number) of the set of data structures is equal to a number of the multiple packets considered. Thus if one packet from multiple buffers is considered at each round of arbitration, there is one data structure for each buffer. In an example, when the multiple packets are from different buffers, a next packet is a head-of-queue packet for the buffer. Here, the only packets that the arbiter can read from a given buffer are at the head of the buffer. However, the deeper buffer context (e.g., packets not at the head of the buffer) are considered when deciding which buffer head to read and deliver to an output. While taking packets out-of-order from a buffer is possible, it generally complicates the arbitration, possibly using additional circuitry to prevent a packet languishing in a buffer for too long. In an example, the cardinality of the set of data structures is equal to a number of virtual queues in the buffer. This example considers a single buffer with virtual sub-buffers based on, for example, virtual channels such as are present in many CPI packets. In an example, the number of virtual queues is equal to a number of outputs of the buffer in the network device. This example represents a structure to facilitate CPI to AXI bridging, or the like, where the virtual channel has a correlation to a hardwired channel on an intra-chiplet communication technology.

In various examples, the chiplet network 285 can be part of an asynchronous switching fabric. Here, a data packet can be routed along any of various paths such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache can also be implemented in off-die memories 275 or 280; and in some such examples can be accessed directly by cache controller 215. Data read by the off-die memory controller 220 can be cached in the cache 210 by the cache controller 215 for later use.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses executable instructions operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operator, the built-in atomic unit 265 receives the request and reads data, either from the write merge unit 255 or directly from the off-die memory controller 220. The atomic operator is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic operators such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and optionally up to 32-bytes of data. The atomic operator performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operators can also involve requests for a "standard" atomic operator on the requested data, such as comparatively simple, single cycle, integer atomics—such as fetch-and-increment or compare-and-swap—which will occur with the same throughput as a regular memory read or write operation not involving an atomic operator. For these operations, the cache controller 215 can generally reserve a cache line in the cache 210 by setting a hazard bit (in hardware), so that the cache line cannot be read by another process while it is in transition. The data is obtained from either the off-die memory 275 or the cache 210, and is provided to the built-in atomic unit 265 to perform the requested atomic operator. Following the atomic operator, in addition to providing the resulting data to the packet encoder 240 to encode outgoing data packets for transmission on the chiplet network 285, the built-in atomic unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic operators (also referred to as "custom atomic transactions" or "custom atomic operators"), comparable to the performance of built-in atomic operators. Rather than executing multiple memory accesses, in response to an atomic operator request designating a programmable atomic operator and a memory address, circuitry in the memory controller chiplet 205 transfers the atomic operator request to PAU 270 and sets a hazard bit stored in a memory hazard register corresponding to the memory address of the memory line used in the atomic operator, to ensure that no other operation (read, write, or atomic) is performed on that memory line, which hazard bit is then cleared upon completion of the atomic operator. Additional, direct data paths provided for the PAU 270 executing the programmable atomic operators allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operators. When provided with the extended instruction set for executing programmable atomic operators, the PAU 270 can be embodied as one or more hybrid threading processors. In some example embodiments, the PAU 270 provides barrel-style, round-robin instantaneous thread switching to maintain a high instruction-per-clock rate.

Programmable atomic operators can be performed by the PAU 270 involving requests for a programmable atomic operator on the requested data. A user can prepare programming code to provide such programmable atomic operators. For example, the programmable atomic operators can be comparatively simple, multi-cycle operations such as floating-point addition, or comparatively complex, multi-instruction operations such as a Bloom filter insert. The programmable atomic operators can be the same as or different than the predetermined atomic operators, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operator. Following the atomic operator, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache control circuit 215.

In selected examples, the approach taken for programmable atomic operators is to provide multiple, generic, custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operator; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
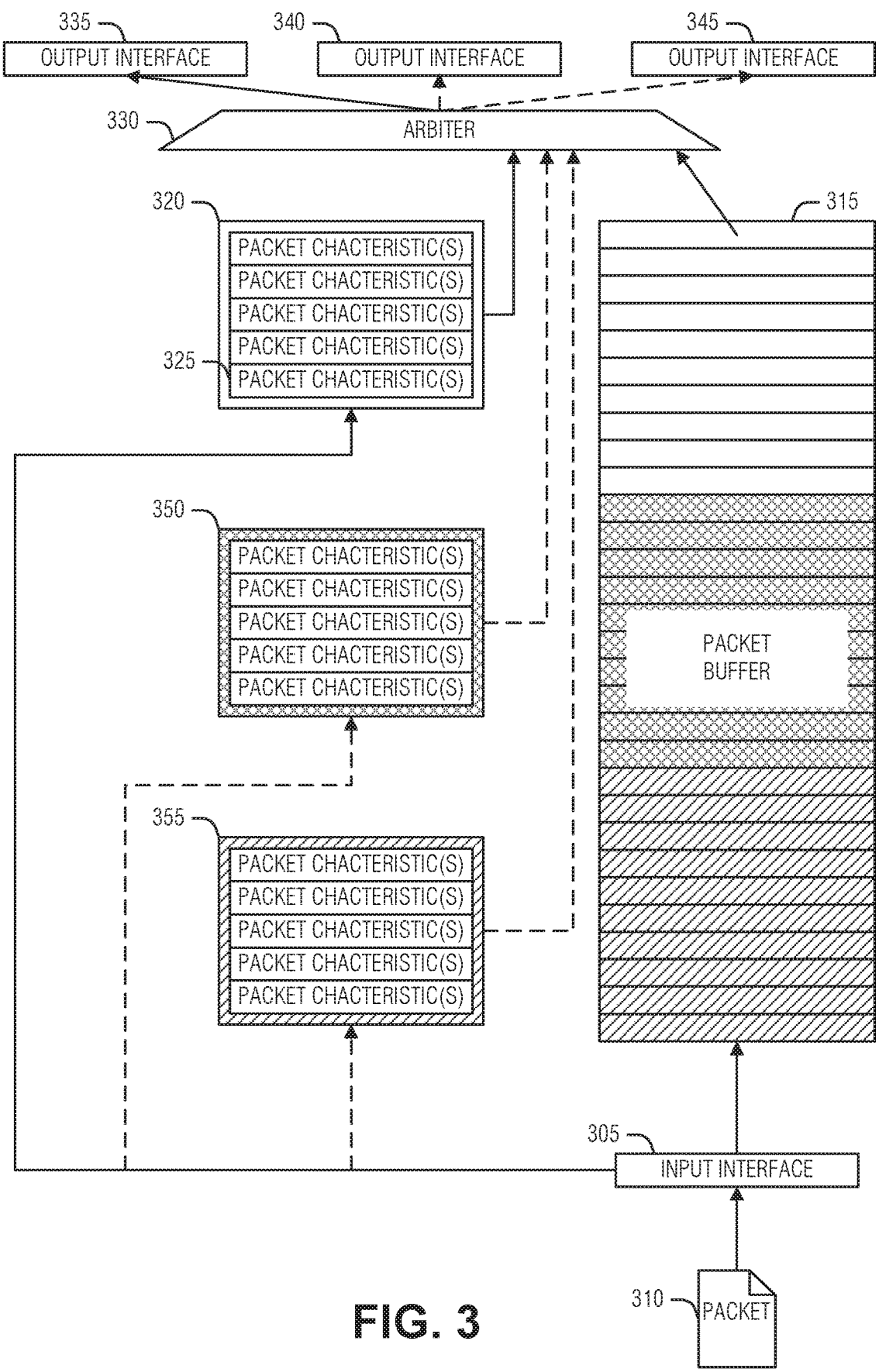
FIG. 3 illustrates a processing flow through a packet buffer, according to an embodiment.

FIG. 3 illustrates a processing flow through a packet buffer, according to an embodiment. As illustrated, the packet 310 is received at an input interface 305 of a network device. The packet is buffered (e.g., placed into the buffer 315). As illustrated, the buffer 315 is split into three sub-buffers, indicated by different shadings. For each sub-buffer, a data structure is maintained, illustrated at data structure 355, data structure 350, and data structure 320. All of the data structures maintain records of packets in the buffer 315, such as record 325 for the packet 310.

The arbiter 330 is implemented as a circuit block in the network device and is communicatively coupled to, when in operation, the buffer 315 and the data structures 355, 350, and 320. During a round of arbitration (e.g., at each clock cycle), the arbiter consults the data structures 355, 350, or 320 to determine from which sub-buffer to read a packet and deliver to the appropriate output, such as output interface 335, output interface 340, or output interface 345. The actual technique used by the arbiter 330 to compare the records can vary. For example, the arbiter 330 can sum the packet sizes for the top three packets in each sub-buffer and select the smallest. In an example, the arbiter 330 can use a threshold on a packet size at the head of a sub-buffer and, only when the size is above the threshold, look deeper into a second sub-buffer to determine whether to deliver the packet immediately or to wait.

Recording packet information pertinent to read arbitration in a separate structure can enable more packets to be considered by the arbiter. Information like packet size and location in the buffer, which will allow the arbiter to qualify a packet and avoid collisions reading packets in the input buffer. This implementation will allow an arbiter reading the buffer to consider more packets for arbitration which can increase efficiency and lower latency.

Figure 4:
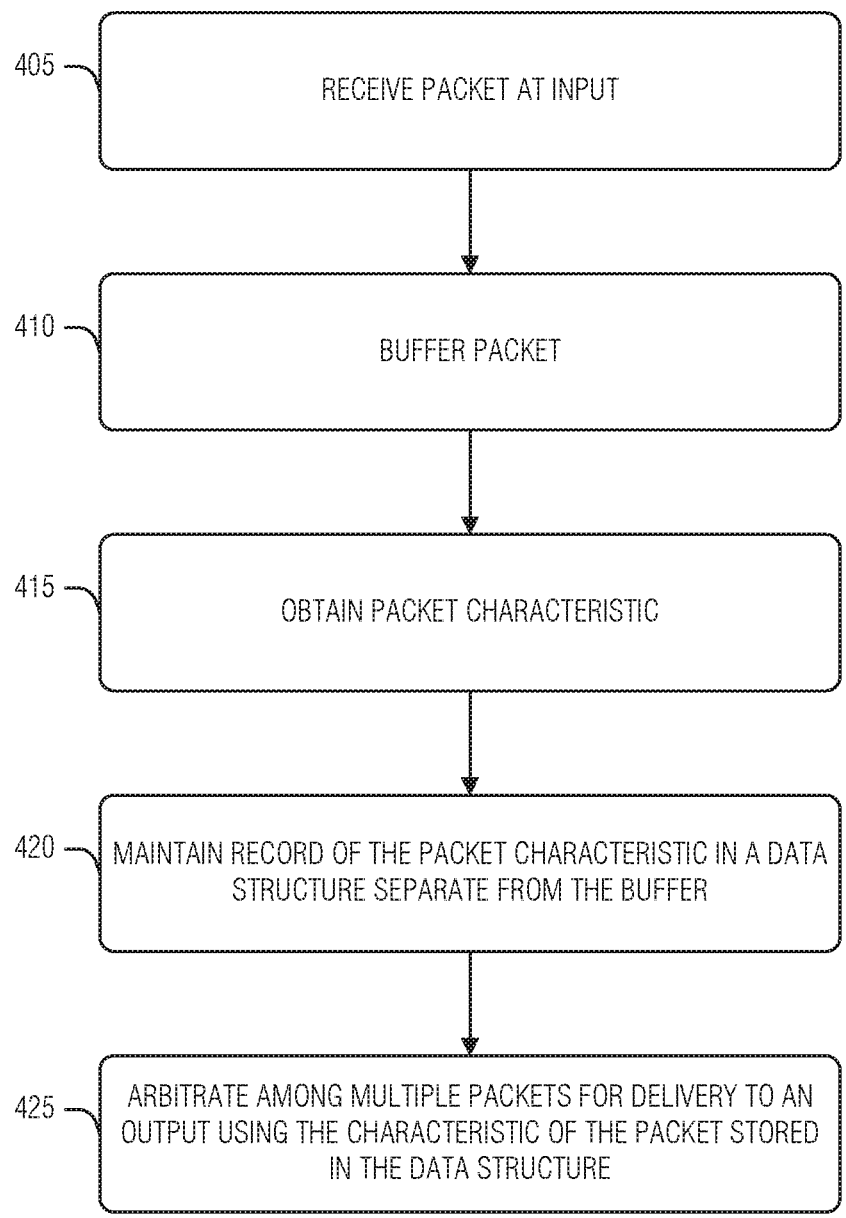
FIG. 4 is a flow chart of an example of a method for packet arbitration for buffered packets in a network device according to an embodiment.

FIG. 4 is a flow chart of an example of a method 400 for packet arbitration for buffered packets in a network device according to an embodiment. Operations of the method 400 are performed by computer hardware, such as that described with respect to FIG. 1 (e.g., a NOC interface in the NOC 130 or in other chiplets such as the memory controller chiplet 140), FIG. 2 (e.g., the network interface 225 or network input queues 235), or FIG. 5 (e.g., processing circuitry).

At operation 405, a packet is received at an input of the network device.

At operation 410, the packet is placed in a buffer for the input.

At operation 415, a characteristic of the packet is obtained. In an example, the packet characteristic is a size of the packet and wherein obtaining the characteristic of the packet includes measuring the size of the packet. In an example, the characteristic of the packet is a position of the packet in the buffer.

At operation 420, a record for the packet is written into a data structure that is independent of the buffer. The written record includes the packet characteristic obtained at operation 415. In an example, when the packet characteristic is a position of the packet in the buffer, the record can be updated to indicate a new position of the packet in the buffer in response to the packet moving within the buffer. Here, movement within the buffer can include copying the packet from one location to another location in the buffer. Alternatively the packet remains in the same physical memory device (e.g., memory block register, etc.) yet moves in relation to a head pointer or tail pointer of the buffer. In this example, the packet's movement is relative to the head of the buffer yet additional memory copying to physical move the packet is avoided. In an example, the record includes multiple characteristics of the packet.

At operation 425, arbitration is performed among multiple packets to select a next packet from the buffer for delivery to an output. Here, the arbitration is based on the characteristic of the packet obtained from the record in the data structure. In an example, when the record includes multiple packet characteristics, the arbitration among the multiple packets to select the next packet from the buffer is based on the multiple characteristics of the packet held in the record in the data structure.

In an example, the data structure is one of a set of data structures corresponding to the buffer and used to hold characteristics for buffered packets considered in the arbitration. In an example, the cardinality of the set of data structures is equal to a number of the multiple packets. In an example, the multiple packets are from different buffers, and wherein the next packet is a head-of-queue packet for the buffer. the cardinality of the set of data structures is equal to a number of virtual queues in the buffer. In an example, the number of virtual queues is equal to a number of outputs of the buffer in the network device.

Figure 5:
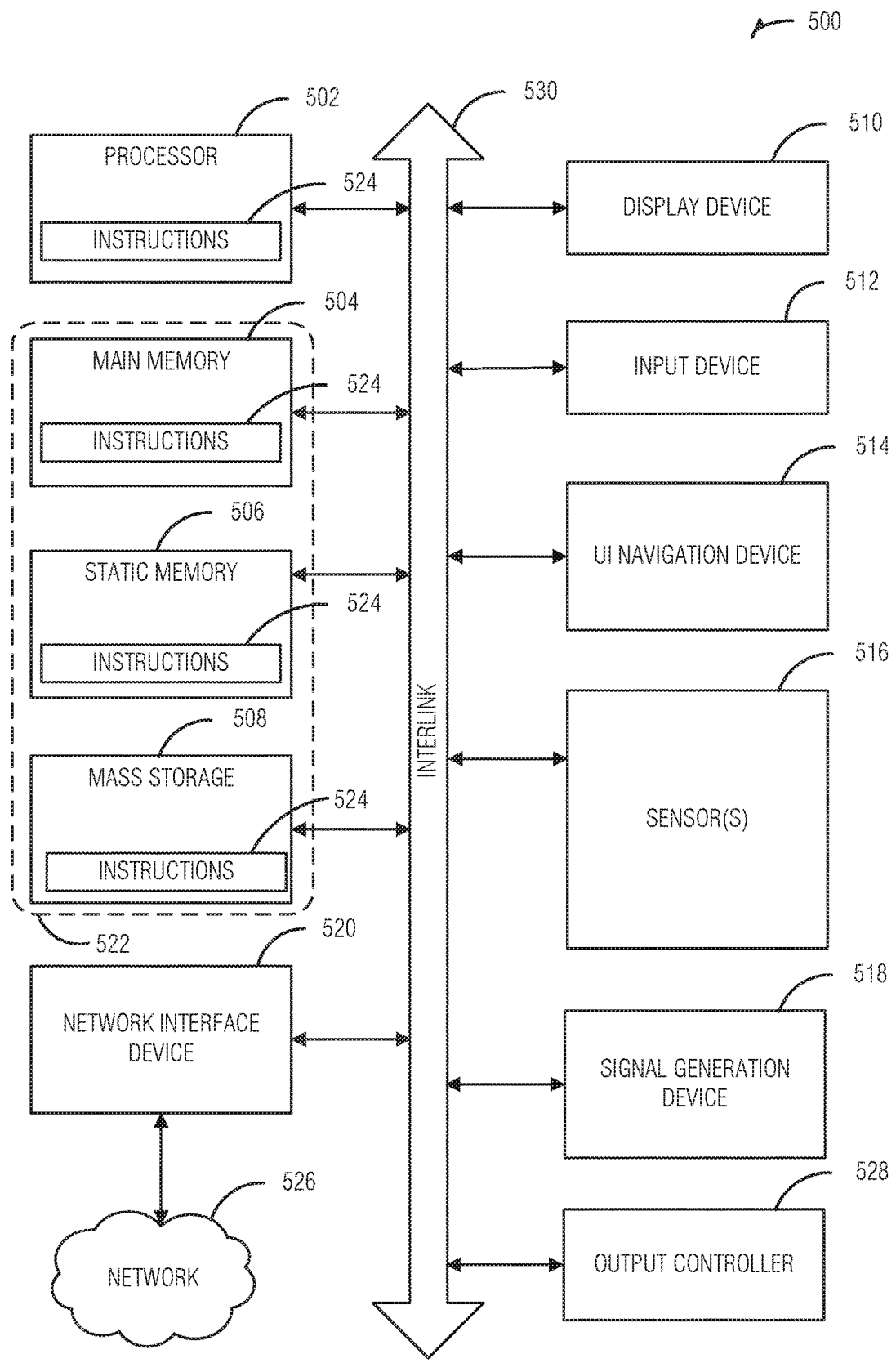
FIG. 5 is a block diagram of an example of a machine with which, in which, or by which embodiments of the present disclosure can operate.

FIG. 5 illustrates a block diagram of an example machine 500 with which, in which, or by which any one or more of the techniques (e.g., methodologies) discussed herein can be implemented. Examples, as described herein, can include, or can operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 can include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drives, tape drives, flash storage, or other block devices) some or all of which can communicate with each other via an interlink (e.g., bus) 530. The machine 500 can further include a display unit 510, an alphanumeric input device 512 (e.g., a keyboard), and a user interface (UI) navigation device 514 (e.g., a mouse). In an example, the display unit 510, input device 512 and UI navigation device 514 can be a touch screen display. The machine 500 can additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 can be, or include, a machine readable medium 522 on which is stored one or more sets of data structures or instructions 524 (e.g., software) embodying or utilized by any one or more of the techniques or functions described herein. The instructions 524 can also reside, completely or at least partially, within any of registers of the processor 502, the main memory 504 the static memory 506, or the mass storage 508 during execution thereof by the machine 500. In an example, one or any combination of the hardware processor 502, the main memory 504, the static memory 506, or the mass storage 508 can constitute the machine readable media 522. While the machine readable medium 522 is illustrated as a single medium, the term "machine readable medium" can include a single medium or multiple media (e.g., a centralized or distributed database, or associated caches and servers) configured to store the one or more instructions 524.

The term "machine readable medium" can include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 522 can be representative of the instructions 524, such as instructions 524 themselves or a format from which the instructions 524 can be derived. This format from which the instructions 524 can be derived can include source code, encoded instructions (e.g., in compressed or encrypted form) packaged instructions (e.g., split into multiple packages), or the like. The information representative of the instructions 524 in the machine readable medium 522 can be processed by processing circuitry into the instructions to implement any of the operations discussed herein. For example, deriving the instructions 524 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 can include assembly, compilation, or interpretation of the information (e.g., by the processing circuitry) to create the instructions 524 from some intermediate or preprocessed format provided by the machine readable medium 522. The information, when provided in multiple parts, can be combined, unpacked, and modified to create the instructions 524. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 can be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 can include one or more physical jacks (e.g., Ethernet, coaxial, or phone jacks) or one or more antennas to connect to the communications network 526. In an example, the network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

Example 1 is a network device comprising: an input configured to receive a packet; a buffer for the input to hold the packet; an output; packet analyzer circuitry configured to: obtain a characteristic of the packet; and write a record for the packet into a data structure independent of the buffer, the record including the characteristic; and an arbiter configured to perform arbitration among multiple packets to select a next packet from the buffer for delivery to the output based on the characteristic of the packet obtained from the record in the data structure.

In Example 2, the subject matter of Example 1, wherein the characteristic of the packet is a size of the packet, and wherein, to obtain the characteristic of the packet, the packet analyzer circuitry is configured to measure the size of the packet.

In Example 3, the subject matter of any of Examples 1-2, wherein the characteristic of the packet is a position of the packet in the buffer.

In Example 4, the subject matter of Example 3, wherein the packet analyzer circuitry is configured to update the record to include a new position of the packet in the buffer in response to the packet moving to the new position.

In Example 5, the subject matter of any of Examples 1-4, wherein the record includes multiple characteristics of the packet.

In Example 6, the subject matter of Example 5, wherein the arbitration among the multiple packets to select the next packet from the buffer is based on the multiple characteristics of the packet held in the record in the data structure.

In Example 7, the subject matter of any of Examples 1-6, wherein the data structure is one of a set of data structures corresponding to the buffer and used to hold characteristics for buffered packets considered in the arbitration.

In Example 8, the subject matter of Example 7, wherein a cardinality of the set of data structures is equal to a number of the multiple packets.

In Example 9, the subject matter of Example 8, wherein a cardinality of the set of data structures is equal to a number of virtual queues in the buffer.

In Example 10, the subject matter of Example 9, wherein the number of virtual queues is equal to a number of outputs of the buffer in the network device.

In Example 11, the subject matter of any of Examples 1-10, wherein the network device is a switch in a chiplet system.

In Example 12, the subject matter of Example 11, wherein the switch is on a chiplet that includes a memory controller for the chiplet system.

In Example 13, the subject matter of any of Examples 1-12, wherein the multiple packets are from different buffers, and wherein the next packet is a head-of-queue packet for the buffer.

Example 14 is a method comprising: receiving a packet at an input of a network device; placing the packet in a buffer for the input; obtaining a characteristic of the packet; writing a record for the packet into a data structure independent of the buffer the record including the characteristic; and performing arbitration among multiple packets to select a next packet from the buffer for delivery to an output based on the characteristic of the packet obtained from the record in the data structure.

In Example 15, the subject matter of Example 14, wherein the characteristic of the packet is a size of the packet, and wherein obtaining the characteristic of the packet includes measuring the size of the packet.

In Example 16, the subject matter of any of Examples 14-15, wherein the characteristic of the packet is a position of the packet in the buffer.

In Example 17, the subject matter of Example 16, comprising updating the record to include a new position of the packet in the buffer in response to the packet moving to the new position.

In Example 18, the subject matter of any of Examples 14-17, wherein the record includes multiple characteristics of the packet.

In Example 19, the subject matter of Example 18, wherein the arbitration among the multiple packets to select the next packet from the buffer is based on the multiple characteristics of the packet held in the record in the data structure.

In Example 20, the subject matter of any of Examples 14-19, wherein the data structure is one of a set of data structures corresponding to the buffer and used to hold characteristics for buffered packets considered in the arbitration.

In Example 21, the subject matter of Example 20, wherein a cardinality of the set of data structures is equal to a number of the multiple packets.

In Example 22, the subject matter of Example 21, wherein a cardinality of the set of data structures is equal to a number of virtual queues in the buffer.

In Example 23, the subject matter of Example 22, wherein the number of virtual queues is equal to a number of outputs of the buffer in the network device.

In Example 24, the subject matter of any of Examples 14-23, wherein the network device is a switch in a chiplet system.

In Example 25, the subject matter of Example 24, wherein the switch is on a chiplet that includes a memory controller for the chiplet system.

In Example 26, the subject matter of any of Examples 14-25, wherein the multiple packets are from different buffers, and wherein the next packet is a head-of-queue packet for the buffer.

Example 27 is a machine-readable medium including instructions that, when executed by circuitry of a network device, cause the network device to perform operations comprising: receiving a packet at an input of the network device; placing the packet in a buffer for the input; obtaining a characteristic of the packet; writing a record for the packet into a data structure independent of the buffer, the record including the characteristic; and performing arbitration among multiple packets to select a next packet from the buffer for delivery to an output based on the characteristic of the packet obtained from the record in the data structure.

In Example 28, the subject matter of Example 27, wherein the characteristic of the packet is a size of the packet, and wherein obtaining the characteristic of the packet includes measuring the size of the packet.

In Example 29, the subject matter of any of Examples 27-28, wherein the characteristic of the packet is a position of the packet in the buffer.

In Example 30, the subject matter of Example 29, wherein the operations comprise updating the record to include a new position of the packet in the buffer in response to the packet moving to the new position.

In Example 31, the subject matter of any of Examples 27-30, wherein the record includes multiple characteristics of the packet.

In Example 32, the subject matter of Example 31, wherein the arbitration among the multiple packets to select the next packet from the buffer is based on the multiple characteristics of the packet held in the record in the data structure.

In Example 33, the subject matter of any of Examples 27-32, wherein the data structure is one of a set of data structures corresponding to the buffer and used to hold characteristics for buffered packets considered in the arbitration.

In Example 34, the subject matter of Example 33, wherein a cardinality of the set of data structures is equal to a number of the multiple packets.

In Example 35, the subject matter of Example 34, wherein a cardinality of the set of data structures is equal to a number of virtual queues in the buffer.

In Example 36, the subject matter of Example 35, wherein the number of virtual queues is equal to a number of outputs of the buffer in the network device.

In Example 37, the subject matter of any of Examples 27-36, wherein the network device is a switch in a chiplet system.

In Example 38, the subject matter of Example 37, wherein the switch is on a chiplet that includes a memory controller for the chiplet system.

In Example 39, the subject matter of any of Examples 27-38, wherein the multiple packets are from different buffers, and wherein the next packet is a head-of-queue packet for the buffer.

Example 40 is a system comprising: means for receiving a packet at an input of a network device; means for placing the packet in a buffer for the input; means for obtaining a characteristic of the packet; means for writing a record for the packet into a data structure independent of the buffer, the record including the characteristic; and means for performing arbitration among multiple packets to select a next packet from the buffer for delivery to an output based on the characteristic of the packet obtained from the record in the data structure.

In Example 41, the subject matter of Example 40, wherein the characteristic of the packet is a size of the packet, and wherein the means for obtaining the characteristic of the packet include means for measuring the size of the packet.

In Example 42, the subject matter of any of Examples 40-41, wherein the characteristic of the packet is a position of the packet in the buffer.

In Example 43, the subject matter of Example 42, comprising means for updating the record to include a new position of the packet in the buffer in response to the packet moving to the new position.

In Example 44, the subject matter of any of Examples 40-43, wherein the record includes multiple characteristics of the packet.

In Example 45, the subject matter of Example 44, wherein the arbitration among the multiple packets to select the next packet from the buffer is based on the multiple characteristics of the packet held in the record in the data structure.

In Example 46, the subject matter of any of Examples 40-45, wherein the data structure is one of a set of data structures corresponding to the buffer and used to hold characteristics for buffered packets considered in the arbitration.

In Example 47, the subject matter of Example 46, wherein a cardinality of the set of data structures is equal to a number of the multiple packets.

In Example 48, the subject matter of Example 47, wherein a cardinality of the set of data structures is equal to a number of virtual queues in the buffer.

In Example 49, the subject matter of Example 48, wherein the number of virtual queues is equal to a number of outputs of the buffer in the network device.

In Example 50, the subject matter of any of Examples 40-49, wherein the network device is a switch in a chiplet system.

In Example 51, the subject matter of Example 50, wherein the switch is on a chiplet that includes a memory controller for the chiplet system.

In Example 52, the subject matter of any of Examples 40-51, wherein the multiple packets are from different buffers, and wherein the next packet is a head-of-queue packet for the buffer.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
   an input couplable to a network and configured to receive a packet;
   a memory configured to implement a buffer for the input to hold the packet;
   an output couplable to the network;
   packet analyzer circuitry configured to:

obtain a characteristic of the packet, wherein the characteristic is a position of the packet in the buffer; and write a record for the packet into a data structure independent of the buffer, the record including the characteristic; and an arbiter configured to perform arbitration among multiple packets to select a next packet from the buffer for delivery to the output based on the characteristic of the packet obtained from the record in the data structure, wherein the next packet is not the packet, and wherein the arbiter is configured to update the position of the packet in the buffer in the record for the packet in the data structure in response to the packet moving to a new position in the buffer as a result of the next packet being delivered to the output.

2. The apparatus of claim 1, wherein the record includes multiple characteristics of the packet including a second characteristic of the packet that is a size of the packet.

3. The apparatus of claim 2, wherein the arbitration among the multiple packets to select the next packet from the buffer is based on the multiple characteristics of the packet held in the record in the data structure.

4. The apparatus of claim 1, wherein the data structure is one of a set of data structures corresponding to the buffer and used to hold characteristics for buffered packets considered in the arbitration.

5. The apparatus of claim 4, wherein a cardinality of the set of data structures is equal to a number of the multiple packets.

6. The apparatus of claim 5, wherein the cardinality of the set of data structures is equal to a number of virtual queues in the buffer, each of the multiple packets being at a head of one of the virtual queues.

7. The apparatus of claim 1, wherein the apparatus is a switch in a chiplet system.

8. The apparatus of claim 7, wherein the switch is on a chiplet that includes a memory controller for the chiplet system.

9. The apparatus of claim 1, wherein the multiple packets are from different buffers, and wherein the next packet is a head-of-queue packet for the buffer.

10. A method comprising:

receiving a packet at an input of a network device;

placing the packet in a buffer for the input;

obtaining a characteristic of the packet, wherein the characteristic is a position of the packet in the buffer;

writing a record for the packet into a data structure independent of the buffer, the record including the characteristic; and performing arbitration among multiple packets to select a next packet from the buffer for delivery to an output based on the characteristic of the packet obtained from the record in the data structure, wherein the next packet is not the packet, and wherein performing the arbitration includes updating the position of the packet in the buffer in the record for the packet in the data structure in response to the packet moving to a new position in the buffer as a result of the next packet being delivered to the output.

11. The method of claim 10, wherein the record includes multiple characteristics of the packet including a second characteristic of the packet that is a size of the packet.

12. The method of claim 11, wherein the arbitration among the multiple packets to select the next packet from the buffer is based on the multiple characteristics of the packet held in the record in the data structure.

13. The method of claim 10, wherein the data structure is one of a set of data structures corresponding to the buffer and used to hold characteristics for buffered packets considered in the arbitration.

14. The method of claim 13, wherein a cardinality of the set of data structures is equal to a number of the multiple packets.

15. The method of claim 14, the cardinality of the set of data structures is equal to a number of virtual queues in the buffer, each of the multiple packets being at a head of one of the virtual queues.

16. The method of claim 10, wherein the network device is a switch in a chiplet system.

17. The method of claim 16, wherein the switch is on a chiplet that includes a memory controller for the chiplet system.

18. The method of claim 10, wherein the multiple packets are from different buffers, and wherein the next packet is a head-of-queue packet for the buffer.

19. A non-transitory machine-readable medium including instructions that, when executed by circuitry of a network device, cause the network device to perform operations comprising:

receiving a packet at an input of the network device;

placing the packet in a buffer for the input;

obtaining a characteristic of the packet, wherein the characteristic is a position of the packet in the buffer;

writing a record for the packet into a data structure independent of the buffer, the record including the characteristic; and performing arbitration among multiple packets to select a next packet from the buffer for delivery to an output based on the characteristic of the packet obtained from the record in the data structure, wherein the next packet is not the packet, and wherein performing the arbitration includes updating the position of the packet in the buffer in the record for the packet in the data structure in response to the packet moving to a new position in the buffer as a result of the next packet being delivered to the output.

20. The machine-readable medium of claim 19, wherein the record includes multiple characteristics of the packet including a second characteristic of the packet that is a size of the packet.

21. The machine-readable medium of claim 20, wherein the arbitration among the multiple packets to select the next packet from the buffer is based on the multiple characteristics of the packet held in the record in the data structure.

22. The machine-readable medium of claim 19, wherein the data structure is one of a set of data structures corresponding to the buffer and used to hold characteristics for buffered packets considered in the arbitration.

23. The machine-readable medium of claim 22, wherein a cardinality of the set of data structures is equal to a number of the multiple packets.

24. The machine-readable medium of claim 23, wherein the cardinality of the set of data structures is equal to a number of virtual queues in the buffer, each of the multiple packets being at a head of one of the virtual queues.

25. The machine-readable medium of claim 19, wherein the network device is a switch in a chiplet system.

26. The machine-readable medium of claim 25, wherein the switch is on a chiplet that includes a memory controller for the chiplet system.

27. The machine-readable medium of claim 19, wherein the multiple packets are from different buffers, and wherein the next packet is a head-of-queue packet for the buffer.

* * * * *